United States Patent [19]
Scott

[11] 4,001,184
[45] Jan. 4, 1977

[54] PROCESS FOR PREPARING A BRANCHED POLYCARBONATE

[75] Inventor: Steven William Scott, Evansville, Ind.

[73] Assignee: General Electric Company, Pittsfield, Mass.

[22] Filed: Mar. 31, 1975

[21] Appl. No.: 563,494

[52] U.S. Cl. .............................................. 260/47 XA
[51] Int. Cl.$^2$ ...................................... C08G 17/13
[58] Field of Search ...................... 260/47 XA, 463

[56] References Cited

UNITED STATES PATENTS

| | | | |
|---|---|---|---|
| 3,291,774 | 12/1966 | Bolgiano | 260/47 XA |
| 3,525,712 | 8/1970 | Kramer | 260/47 XA |
| 3,816,373 | 6/1974 | Hoogeboom | 260/47 XA |

*Primary Examiner*—Theodore Pertilla
*Attorney, Agent, or Firm*—Donald M. Papuga; William F. Mufatti

[57] ABSTRACT

A process for preparing a thermoplastic randomly branched aromatic polycarbonate which process comprises reacting at least 20 weight percent of a stoichiometric quantity of a carbonate precursor with a mixture of a dihydric phenol and at least 0.05 mole percent of a polyfunctional aromatic compound in a medium of water and a solvent for the polycarbonate having present therein at least 1.2 mole percent of a polymerization catalyst, while concomitantly adding to the reaction medium sufficient alkali metal hydroxide to maintain a pH range of about 3.0 to about 6.0, and then adding sufficient alkali metal hydroxide to raise the pH to at least about 9.0 to less than about 12 while reacting the remaining carbonate precursor.

14 Claims, No Drawings

PROCESS FOR PREPARING A BRANCHED POLYCARBONATE

This invention relates to a process for preparing a thermoplastic randomly branched polycarbonate having improved resistance to thermal oxidation and having excellent blow molding properties and to a novel branched polycarbonate.

BACKGROUND OF THE INVENTION

Polycarbonates are well known, commercially available materials which have achieved wide acceptance in the plastics industry. Such polymers are prepared by reacting a carbonate precursor such as phosgene, for example, with a dihydric phenol such as 2,2-bis(4-hydroxyphenyl) propane, hereinafter referred to as "bisphenol-A," to provide a linear polymer consisting of dihydric phenol derived units bonded to one another through carbonate linkages. Generally speaking, such polymers offer a high resistance to mineral acids, having a high tensile strength and a dimensional stability and impact strength far surpassing that of any other thermoplastic material.

These polycarbonates are an exception to most thermoplastic polymers in their melt rheology behavior. Most thermoplastic polymers exhibit non-Newtonian flow characteristics over essentially all melt processing conditions. Newtonian flow is defined as the type of flow occurring in a liquid system where the rate of shear is directly proportional to the shearing force. Linear bisphenol-A polycarbonate exhibits Newtonian flow at normal processing temperatures and shear rates below 300 reciprocal seconds.

Two other characteristics of molten thermoplastic polymers are significant for molding and these are melt elasticity and melt strength. Melt elasticity is the recovery of the elastic energy stored within the melt because of distortion or orientation of the molecules by shearing stresses. Melt strength may be simply described as the tenacity of a molten strand and is really the ability of the melt to support a stress.

Both of these are important in extrusion blow molding particularly to fabrication by extrusion blow molding. Non-Newtonian flow characteristics tend to impart melt elasticity and melt strength to such polymers allowing the use thereof in blow molding fabrication. In the usual blow molding operation, a hollow tube of molten thermoplastic is extruded vertically downward at a temperature of about 200°– 400° C. A mold then surrounds the tube and air introduced into the tube forces it to conform to the shape of the mold. The length of the tube and the quantity of material comprising the tube are limiting factors in determining the ultimate size and wall thickness of the molded part. The fluidity of the melt obtained from bisphenol-A polycarbonate, or the lack of melt strength and also the paucity of extrudate swelling, serve to limit blow molding applications to relatively small, thin walled parts. Temperatures must also be extremely carefully controlled to prevent the desired length of extruded tube from falling away before the mold can close around it for blowing. Consequently, it will be appreciated that the Newtonian behavior of polycarbonate resin melts has served to restrict severely their use in the production of large hollow bodies by conventional extrusion blow-molding operations as well as in the production of various shapes by profile extrusion methods.

Thermoplastic randomly branched polycarbonates possess definite and unique properties which allow their use in preparing articles not heretofore easily or readily produced with linear reaction products of a dihydric phenol and a carbonate precursor. The thermoplastic randomly branched polycarbonates are prepared by reacting a polyfunctional compound containing more than 2 functional groups with a dihydric phenol and a carbonate precursor.

Several prior art disclosures such as exemplified by U.S. Pat. Nos. 2,950,266 and 3,030,335 concerning the addition of a trifunctional additive to polycarbonate forming reactions between dihydric phenols and carbonyl halides teach that if a cross-linked product does not occur as a direct result of the initial polymerization reaction, the final reaction product of the dihydric phenol, the trifunctional compound, and the carbonyl halide would be a heat curable product.

Other prior art attempts have been made to incorporate a trifunctional compound into polycarbonates of dihydric phenols as exemplified by U.S. Pat. No. 3,094,508. This has been limited to the preparation of extremely high molecular weight (i.e., in excess of 200,000) polymers having melting points exceeding 300° C., under very limited process conditions such as a temperature range of 28°–34° C, which conditions are deemed necessary to avoid gelation, i.e., formation of an insoluble, infusible product. Aside from the fact that such extremely high molecular weight, high melting polymers have little commercial importance as molding resins, their preparation requires carefully controlled process conditions which are both cumbersome and expensive. In addition, other attempts have been made to provide polycarbonate resins which exhibit non-Newtonian melt characteristics as, for example, disclosed in U.S. Pat. No. 3,166,606. However, the polycarbonates there disclosed consist of a physical blend of two or more polycarbonate resins having differing values of reduced viscosity. Moreover, the individual polycarbonate components disclosed by the patentees in the production of such polycarbonate blends are produced entirely from difunctional reactants.

DESCRIPTION OF THE INVENTION

According to the present invention, there is provided a process for the preparation of a randomly branched polycarbonate in a highly efficient onestep process. Also, the branched polycarbonate produced has improved resistance to thermal oxidation, excellent blow molding properties along with the properties of non-Newtonian melt flow, melt elasticity and melt-strength.

The instant process comprises reacting at least 20 weight percent of a stoichiometric quantity of a carbonate precursor with a mixture of a dihydric phenol and at least 0.05 mole percent of a polyfunctional aromatic compound in a medium of water and a solvent for the polycarbonate having present therein at least 1.2 mole percent of a polymerization catalyst, a molecular weight regulator, while concomitantly adding to the reaction medium sufficient alkali metal hydroxide to maintain a pH range of about 3.0 to about 6.0, and then adding sufficient alkali metal hydroxide to raise the pH to at least about 9.0 but less than about 12 while reacting the remaining amount of the stoichiometric quantity of the carbonate precursor; said polyfunctional aromatic compound containing at least three functional groups which are selected from the group consisting of carboxyl, carboxylic anhydride and haloformyl or mixtures thereof.

The amount of the polyfunctional aromatic compound which is reacted with the dihydric phenol and the carbonate precursor to provide the thermoplastic randomly branched polycarbonate of this invention is critical to the extent that the amount employed must be such as to produce a randomly branched polycarbonate which is a true thermoplastic as defined previously. If an amount of less than 0.05 mole percent, based upon the total moles of the dihydric phenol is used, the resulting polymer will not exhibit the desired non-Newtonian melt characteristics of the instant invention. Preferably, it is desirable to employ 0.05 to about 3.0 and more particularly, 0.05 – 1.0 mole percent of the polyfunctional aromatic compound, based upon the total moles of dihydric phenol.

The polyfunctional aromatic compound contains at least three functional groups which are carboxyl, carboxylic anhydride, haloformyl or mixtures thereof. Examples of these polyfunctional aromatic compounds which may be employed in the practice of this invention include: trimellitic anhydride; trimellitic acid; trimellityl trichloride; 4-chloroformyl phthalic anhydride; pyromellitic acid; pyromellitic dianhydride; mellitic acid; mellitic anhydride; trimesic acid; benzophenonetetracarboxylic acid; benzophenonetetracarboxylic anhydride and the like. The preferred polyfunctional aromatic compounds are trimellitic anhydride or trimellitic acid, or their haloformyl derivatives.

In the practice of this invention, the dihydric phenols that can be employed are bisphenols such as bis(4-hydroxyphenyl) methane, 2,2-bis(4-hydroxyphenyl) propane, 2,2-bis(4-hydroxy-3-methylphenyl) propane, 4,4-bis(4-hydroxyphenyl) heptane, 2-2 bis(4-hydroxy-3,5-dichlorophenyl) propane, 2-2-bis(4-hydroxy-3,5-dibromophenyl) propane, etc., dihydric phenol ethers such as bis(4-hydroxyphenyl) ether, bis (3,5-dichloro-4-hydroxyphenyl) ether, etc.; dihydroxydiphenyls such as p,p'-dihydroxydiphenyl, 3,3'-dichloro 4,4'-dihydroxydiphenyl, etc.; dihydroxyaryl sulfones such as bis (4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2, 5-dichlorobenzene, 1,4-dihydroxy-3-methylbenzene, etc., and dihydroxy diphenyl sulfoxides such as bis(4-hydroxyphenyl) sulfoxide, bis-(3,5-dibromo-4-hydroxyphenyl) sulfoxide, etc. A variety of additional dihydric phenols are also available and are disclosed in U.S. Pat. Nos. 2,999,835; 3,028,365 and 3,153,008. It is, of course, possible to employ two or more different dihydric phenols or a copolymer of a dihydric phenol with glycol or with hydroxy or acid terminated polyester, or with a dibasic acid in the event a polycarbonate copolymer or interpolymer rather than a homopolymer is desired for use in the preparation of the polycarbonate polymers of this invention. The preferred dihydric phenol is bisphenol-A.

The carbonate precursor employed in the practice of this invention may be either a carbonyl halide or a haloformate. The carbonyl halides which can be employed herein are carbonyl bromide, carbonyl chloride and mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred. The carbonate precursor should be employed in amounts of at least 20 weight percent at a pH range of about 3.0 to about 6.0. At lower levels of the carbonate precursor the incorporation of the branching agent is diminished resulting in a nonacceptable branched polycarbonate.

The molecular weight regulators which can be employed in carrying out the process of this invention include monohydric phenols such as phenol, chroman-I, paratertiary-butylphenol, parabromophenol, primary and secondary amines, etc. Preferably, phenol is employed as the molecular weight regulator.

The catalysts which are employed herein can be any of the suitable catalysts that aid the polymerization of bisphenol-A with phosgene. Suitable catalysts include tertiary amines such as for example, triethylamine, tripropylamine, n,n-dimethylaniline, quaternary ammonium compounds such as for example tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as for example, n-butyltriphenyl phosphonium bromide and methyltriphenyl phosphonium bromide.

The amount of the catalyst used in the instant invention must be at leat 1.2 mole percent based on the moles of dihydric phenol. If an amount of less than 1.2 mole percent, based upon the moles of dihydric phenol is used, the resulting polymer will not exhibit the desired thermal stability or optimum non-Newtonian melt characteristics. Additionally, if an amount of catalyst greater than about 3.0 mole percent, based on the moles of dihydric phenol is used, the molecular weight of the branched polycarbonate produced begins to decrease with a resultant decrease in properties such as melt strength. Preferably, it is desirable to employ 1.5 to 2.0 mole percent of the catalyst, based upon the total moles of dihydric phenol.

An additional important aspect of the instant invention is in the pH control and change of pH of the reaction medium during the reaction. In the instant invention, the pH is maintained at about 3.0 to about 6.0 during the addition of at least 20 weight percent of the stoichiometric quantity of the carbonate precursor by the addition of alkali metal hydroxide. The pH is then raised by the further addition of alkali metal hydroxides to at least a pH of 9.0 but less than about 12.0 and maintaining the pH of the reaction medium at this level during the remaining reaction which can involve adding the remaining amount of the stoichiometric quantity of carbonate precursor or at the completion of the addition of all of the carbonate precursor. The reaction may be carried out by adding more than 20 weight percent of the stoichiometric quantity of carbonate precursor of the entire stoichiometric quantity of carbonate precursor may be added with the mixture of the dihydric phenol and polyfunctional aromatic compound before raising the pH, but the pH must in all cases be raised to at least a pH of 9.0. Preferably, it is desirable to carry out the reaction at a pH of about 3.0 to about 6.0 during the addition of about 20–30 weight percent of the stoichiometric amount of carbonate precursor and then raising the pH to at least 9.0 but less than about 12.0.

Many variations of this pH process condition can be employed in the practice of this invention.

The completion of the addition of the carbonate precursor is not necessarily the end of the reaction. Even after the addition of all of the carbonate precursor, there can still be the building or growing of the polymer chain or further polycondensation of the material in the reaction even though all of the carbonate precursor has been added. The polymer chain growth or increase in molecular weight does not stop instantaneously upon completion of the carbonate precursor addition. Thus, by reaction, it is meant to include even that reaction involving the polycondensation or molecular weight build-up which occurs after all of the carbonate precursor is added.

The alkali metal hydroxide employed in the practice of this invention can be any of the alkali metal hydroxides selected from the groups consisting of the alkali group and earth alkali groups. Specifically, these include potassium hydroxide, sodium hydroxide, lithium hydroxide, calcium hydroxide and magnesium hydroxide.

The reaction among the carbonate precursor and the dihydric phenol and the polyfunctional aromatic compound in accordance with this invention is conducted in the presence of an organic solvent for the thermoplastic randomly branched polycarbonate to be formed, which solvent is inert in the sense that it does not enter into the polymerization reaction, is essentially immiscible with water and does not deleteriously affect the formed polymer. Examples of suitable organic solvents are methylene chloride, ethylene dichloride and chlorobenzene. Other suitable polycarbonate resin solvents will readily occur to those skilled in the art.

The instant method may be carried out at temperature from ambient to about 40° C. However, higher temperatures are within the scope of this invention since the instant method is not temperature dependent.

In the practice of this invention, the process employed herein to prepare the thermoplastic randomly branched aromatic polycarbonate composition comprises reacting at least 20 weight percent of a stoichiometric quantity of a carbonate precursor with a mixture of a dihydric phenol and at least 0.05 mole percent of a polyfunctional aromatic compound in a medium of water and a solvent for the polycarbonate having present therein at least 1.2 mole percent of a polymerization catalyst, a molecular weight regulator, and a solvent for the polycarbonate while concomitantly adding to the reaction medium sufficient alkali metal hydroxide to maintain a pH range of about 3.0 to about 6.0, and then adding sufficient alkali metal hydroxide to raise the pH to at least about 9.0 but less than about 12.0 while reacting the remaining amount of the stoichiometric quantity of the carbonate precursor.

The novel thermoplastic randomly branched aromatic polycarbonate compositions of the instant invention comprise a dihydric phenol, a carbonate precursor, and a polyfunctional aromatic compound containing at least three functional groups selected from the group consisting of carboxyl, carboxylic anhydride, and haloformyl or mixtures thereof.

It is also regarded to be among the features of this invention to include in the composition, other ingredients, such as fillers, mold release agents, pigments, stabilizers, nucleating agents, flame retardant additives, other polymers and the like, in conventional amounts for their conventionally employed purposes.

DESCRIPTION OF THE PREFERRED EMBODIMENT

The following examples are set forth to illustrate more clearly the principles and practices of this invention to those skilled in the art. Unless otherwise specified, where parts are mentioned, they are parts by weight.

EXAMPLE I

420 Parts of distilled water, 228 parts of bisphenol-A, 1.8 parts of triethylamine, 1.4 parts of trimellitic anhydride, 3.2 parts of phenol and 930 parts of methylene chloride are charged to a reactor equipped with an agitator, reflux condenser, phosgene inlet tube, caustic addition tube and pH electrode. The mixture is vigorously agitated. Phosgene is added at the rate of about 1.9 parts per minute for about 20 minutes, about 4.4 parts per minute for about 17 minutes and about 2.5 parts per minute for about 20 minutes. During the addition of phosgene, the pH is maintained at about 4.0 to about 6.0 for the first 20 minutes then raised to between 10.5 to 11.5 and held at about 11.5 for the remaining period of phosgene addition. The pH is controlled by the addition of an aqueous solution (about 25% by weight) of sodium hydroxide. The reaction of phosgene with bisphenol-A is complete as determined by phosgene blow-by and disappearance of free monomer.

The polycarbonate in methylene chloride solution is separated from the aqueous phase, washed and recovered by steam precipitation.

The polycarbonate so recovered has an Intrinsic Viscosity (hereinafter referred to as I.V.) of 0.645 dl/g as measured in dioxane as the solvent at 30° C. The weight average molecular weight is 51,600 and the number average molecular weight is 14,700. The polydispersity index is measured by Gel Permeation Chromatography in ethylene dichloride solvent and is the ratio of weight average molecular weight to number average molecular weight Mw/Mn and is found to be 3.2.

Instron Melt Rheology measurements at 300° C showed the polymer had melt viscosity of about 30,000 poises at a shear rate at 15 reciprocal seconds and 17,000 poises at 150 reciprocal seconds. This demonstrates non-Newtonian flow behavior and melt strength.

EXAMPLE II

570 Parts of distilled water, 228 parts of bisphenol-A, 1.5 parts of triethylamine, 1.37 parts of trimellitic acid, 3.2 parts of phenol and 930 parts of methylene chloride are charged to the reactor as described in Example I. Phosgene is added at the rate of 2.8 parts per minute for about 38 minutes. During the addition of phosgene, the pH is maintained at 6.0 for about 10 minutes, raised to between 9 and 10.5 and maintained there for 10 minutes and raised to about 11.4 and maintained there for about 8 minutes. The pH is controlled by the addition of an aqueous solution (50% by weight) of sodium hydroxide. The end of the reaction is determined as in Example I and the polymer is recovered by the procedure set forth in Example I.

The polycarbonate recovered has an I.V. of 0.629 dl/g as determined by the method set forth in Example I. The apparent melt viscosity (M.V.) is 27,000 poises as determined in a modified melt index apparatus similar to that described in ASTM D-1238, Condition O.

EXAMPLE III

Example I is repeated with the exception that 1.2 parts of phenol is used instead of 3.2 parts. Also, the concentration of the catalyst in mole percent based on concentration of bisphenol-A is as set forth in Table I. The I.V. of the polymers so prepared are set forth in Table I.

TABLE I

| Concentration of Catalyst (Mole Percent) | I.V. (dl/g) |
| --- | --- |
| 1.0 | 0.54 |
| 1.25 | 0.57 |
| 1.5 | 0.70 |
| 1.7 | 0.68 |
| 1.8 | 0.68 |
| 2.0 | 0.63 |
| 2.5 | 0.52 |
| 5.0 | 0.44 |

As can be seen from Table I, when the catalyst concentration is between about 1.5 and 2.0 mole percent, the most consistent and highest molecular weight polymers are produced as shown by the I.V.'s.

EXAMPLE IV

EXAMPLE I is repeated with the exception that 1.4 parts of 4-chloroformyl phthalic anhydride is substituted for the trimellitic anhydride.

The I.V. of the polymer produced is 0.62 dl/g while the M.V. is 21,000 poises.

EXAMPLE V

Example I is repeated with the exception that 1.4 parts of mellitic trianhydride is substituted for the trimellitic anhydride.

The I.V. of the polymer produced is 0.61 dl/g.

EXAMPLE VI

Example I is repeated with the exception that the pH is maintained at between about 3.0 and 6.0 for 3 minutes and then raised to between 10.5 and 11.5 and held there for about 35 minutes.

The I.V. of the polymer is 0.57 dl/g and the M.V. is 5800 poises. Also, the polymer is difficult to recover from its reaction system after phosgenation because of the tendency of the organic phase to emulsify.

EXAMPLE VII

Example I is repeated with the exception that 4.2 parts of trimellitic anhydride is used instead of 1.4 parts. Also, the pH is maintained at about 9.0 to about 10.5 throughout the phosgene addition. After about 30 minutes, the reaction system becomes a thick, unbreakable emulsion. It is not possible to recover a quality high molecular weight polycarbonate from the emulsion using techniques known to those skilled in the art.

From Examples VI and VII, it is seen that if the pH sequence of the instant invention is not followed, a quality high molecular weight branched polymer is not obtained.

EXAMPLE VIII

Example I is repeated with the exception that 3.0 parts of phenol is used instead of 3.2 parts.

The polymer so obtained is tested as in Example I to determine its I.V., M.V. and Yellowness Index (YI) as determined by the Standard Yellowness Gardner Index test on a molded part of 0.125 inches thick which has been molded from the polymer at 600° F. The results are given in Table II.

EXAMPLE IX

Example I is repeated with the exception that 1.4 parts of 4,4-bis(4'-hydroxyphenyl) pentanoic acid is used instead of the 1.4 parts of trimellitic anhydride. Also, 2.8 parts of phenol is used instead of 3.2 parts.

The polymer so obtained is tested as described above and the I.V., M.V. and Y.I. are as set forth in Table II.

EXAMPLE X

Example I is repeated with the exception that 1.4 parts of 1,3,5-pentane tricarboxylic acid is used instead of 1.4 parts of trimellitic anhydride. Also, 2.8 parts of phenol is used instead of 3.2 parts.

The polymer so obtained is tested as described above and the I.V., M.V., and Y.I. are as set forth in Table II.

TABLE II

| Sample | I.V. (dl/g) | M.V. (poises) | Y.I. |
| --- | --- | --- | --- |
| VIII | 0.62 | 22,100 | 4.4 |
| IX | 0.63 | 23,300 | 7.7 |
| X | 0.69 | 27,500 | 6.4 |

As can be seen from Table II, when the aromatic branching agent of the instant invention is used as compared with other branching agent, either wholly or partially aliphatic, the resulting polycarbonate has better thermal stability as shown by the lower Yellowness Index number.

It should, of course, be apparent to those skilled in the art that changes may be made in the particular embodiments of the invention described which are within the full intended scope of the invention as defined by the appended claims.

What is claimed is:

1. A process for preparing a thermoplastic randomly branched aromatic polycarbonate having improved resistance to thermal oxidation and having excellent blow molding properties which process comprises reacting at least 20 weight percent of a stoichiometric quantity of a carbonate precursor with a mixture of a dihydric phenol and at least 0.05 mole percent of a polyfunctional aromatic compound in a medium of water and an inert organic solvent for the polycarbonate having present therein at least 1.2 mole percent of a polymerization catalyst, a molecular weight regulator, and an inert organic solvent for the polycarbonate while concomitantly adding to the reaction medium sufficient alkali metal hydroxide to maintain a pH range of about 3.0 to about 6.0, and then adding sufficient alkali metal hydroxide to raise the pH to at least 9.0 but less than about 12.0 while reacting the remaining amount of the stoichiometric quantity of the carbonate precursor; said polyfunctional aromatic compound containing at least three functional groups selected from the group consisting of carboxyl, carboxylic anhydride and haloformyl or mixtures thereof.

2. The process of claim 1 wherein the amount of polyfunctional aromatic compound is 0.05 to about 3.0 mole percent.

3. The process of claim 1 wherein the carbonate precursor is phosgene.

4. The process of claim 1 wherein the dihydric phenol is bisphenol-A.

5. The process of claim 1 wherein the amount of catalyst is 1.2 to about 3.0 mole percent.

6. The process of claim 1 wherein at least a stoichiometric quantity of the carbonate precursor is added while maintaining the pH at about 3.0 to about 6.0 and then adding sufficient alkali metal hydroxide to raise the pH to at least about 9.0 but less than about 12.0.

7. The process of claim 1 wherein the alkali metal hydroxide is sodium hydroxide.

8. The process of claim 1 wherein the catalyst is triethylamine.

9. The process of claim 1 wherein the polyfunctional aromatic compound is selected from the group consisting of trimellitic anhydride, trimellitic acid, or its haloformyl derivatives or mixtures thereof.

10. A thermoplastic randomly branched aromatic polycarbonate composition having improved resistance to thermal oxidation produced in accordance with the process of claim 1.

11. The composition of claim 10 wherein the dihydric phenol is bisphenol-A.

12. The composition of claim 10 wherein the carbonate precursor is phosgene.

13. The composition of claim 10 wherein the polyfunctional aromatic compound is selected from the group consisting of trimellitic anhydride, trimellitic acid, or its haloformyl derivatives or mixtures thereof.

14. The process of claim 1 wherein the polyfunctional aromatic compound is trimellityl trichloride.

* * * * *